(12) United States Patent
Goyal et al.

(10) Patent No.: US 12,474,399 B2
(45) Date of Patent: Nov. 18, 2025

(54) ANALOG TEST DEVICES FOR INTEGRATED CIRCUITS WITH MULTIPLE POWER DOMAINS

(71) Applicant: NXP B.V., Eindhoven (NL)

(72) Inventors: Prashant Goyal, Noida (IN); Vigyan Jain, Rewari (IN)

(73) Assignee: NXP B.V., Eindhoven (NL)

( * ) Notice: Subject to any disclaimer, the term of this patent is extended or adjusted under 35 U.S.C. 154(b) by 300 days.

(21) Appl. No.: 18/316,554

(22) Filed: May 12, 2023

(65) Prior Publication Data

US 2024/0353478 A1 Oct. 24, 2024

(30) Foreign Application Priority Data

Apr. 19, 2023 (IN) .............................. 202341028358

(51) Int. Cl.
*G01R 31/28* (2006.01)
(52) U.S. Cl.
CPC ..... *G01R 31/2884* (2013.01); *G01R 31/2896* (2013.01)
(58) Field of Classification Search
CPC ............ G01R 31/2884; G01R 31/2896; G01R 31/3167; G01R 31/318558

USPC ....................... 324/762.02, 762.01, 537, 500
See application file for complete search history.

(56) References Cited

U.S. PATENT DOCUMENTS

| | | | |
|---|---|---|---|
| 5,717,329 A * | 2/1998 | Lee .................... | G01R 31/3167 324/73.1 |
| 7,262,621 B1 | 8/2007 | Caffee et al. | |
| 7,417,450 B2 * | 8/2008 | Whetsel ......... | G01R 31/318583 714/734 |
| 8,001,433 B1 * | 8/2011 | Bhatia ............ | G01R 31/318563 716/136 |
| 10,571,518 B1 | 2/2020 | Waayers et al. | |
| 10,971,489 B2 * | 4/2021 | Bourgeat ............. | H10D 89/815 |
| 11,038,345 B2 | 6/2021 | Delshadpour et al. | |
| 2002/0067157 A1 | 6/2002 | Olson | |
| 2011/0221502 A1 | 9/2011 | Meijer et al. | |
| 2016/0202310 A1 * | 7/2016 | Nawrocki .......... | G01R 31/3167 324/750.3 |
| 2017/0077003 A1 * | 3/2017 | Vanhooren ........... | H10D 84/221 |

* cited by examiner

*Primary Examiner* — Giovanni Astacio-Oquendo

(57) ABSTRACT

An analog circuit includes an analog test bus; a plurality of analog circuits including a first analog circuit, each of the plurality of analog circuits associated with a corresponding one of a plurality of power domains; a first plurality of transmission gates coupled between the first analog circuit and the analog test bus; and a first protection device coupled between the first plurality of transmission gates and a ground reference.

20 Claims, 6 Drawing Sheets

ANALOG TEST DEVICES FOR INTEGRATED CIRCUITS WITH MULTIPLE POWER DOMAINS

CROSS-REFERENCE TO RELATED APPLICATIONS

This application claims the priority under 35 U.S.C. § 119 of Indian Patent Application no. 202341028358, filed on 19 Apr. 2023, the contents of which are incorporated by reference herein.

BACKGROUND

To reduce power consumption, manage resources, and contain costs, some integrated circuit devices employ multiple power domains, where each of the different power domains is powered by a different voltage. For example, some integrated circuit devices employ a high-voltage power domain for circuitry that requires a relatively high voltage in order to perform according to specified requirements, and a low-voltage power domain that is able to match the specified requirements with a lower voltage. Such an integrated circuit is able to, for example, consume less power than an integrated circuit employing a single high-voltage power domain. However, integrated circuits with multiple power domains can present additional challenges in their design and implementation.

To illustrate, it is typically desirable to test the circuitry of the integrated circuit during, for example, the design, manufacture, and implementation processes, to ensure that the circuitry performs according to specifications. For analog circuitry, the test process is supported by an analog test bus at the integrated circuit, wherein the analog test bus is connected both to an integrated circuit pin (referred to as a test pin) and one or more sets of analog circuitry associated with corresponding analog functions. During the test process, a stimulus is applied to a set of analog circuitry (e.g., one or more analog circuits), which results in a voltage (referred to as a test voltage) being applied to the analog test bus. The test voltage is compared to an expected voltage to determine whether the set of analog circuitry is operating according to the specification. However, integrated circuits with multiple power domains introduce additional complications to this test process. For example, coupling different sets of analog circuitry associated with different power domains to the same analog test bus can cause latch-up and isolation problems. These problems can be addressed by including multiple analog test buses at the integrated circuit or by employing on-chip monitors, but these approaches consume integrated circuit area and often have limited accuracy and a limited range of available measurements.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
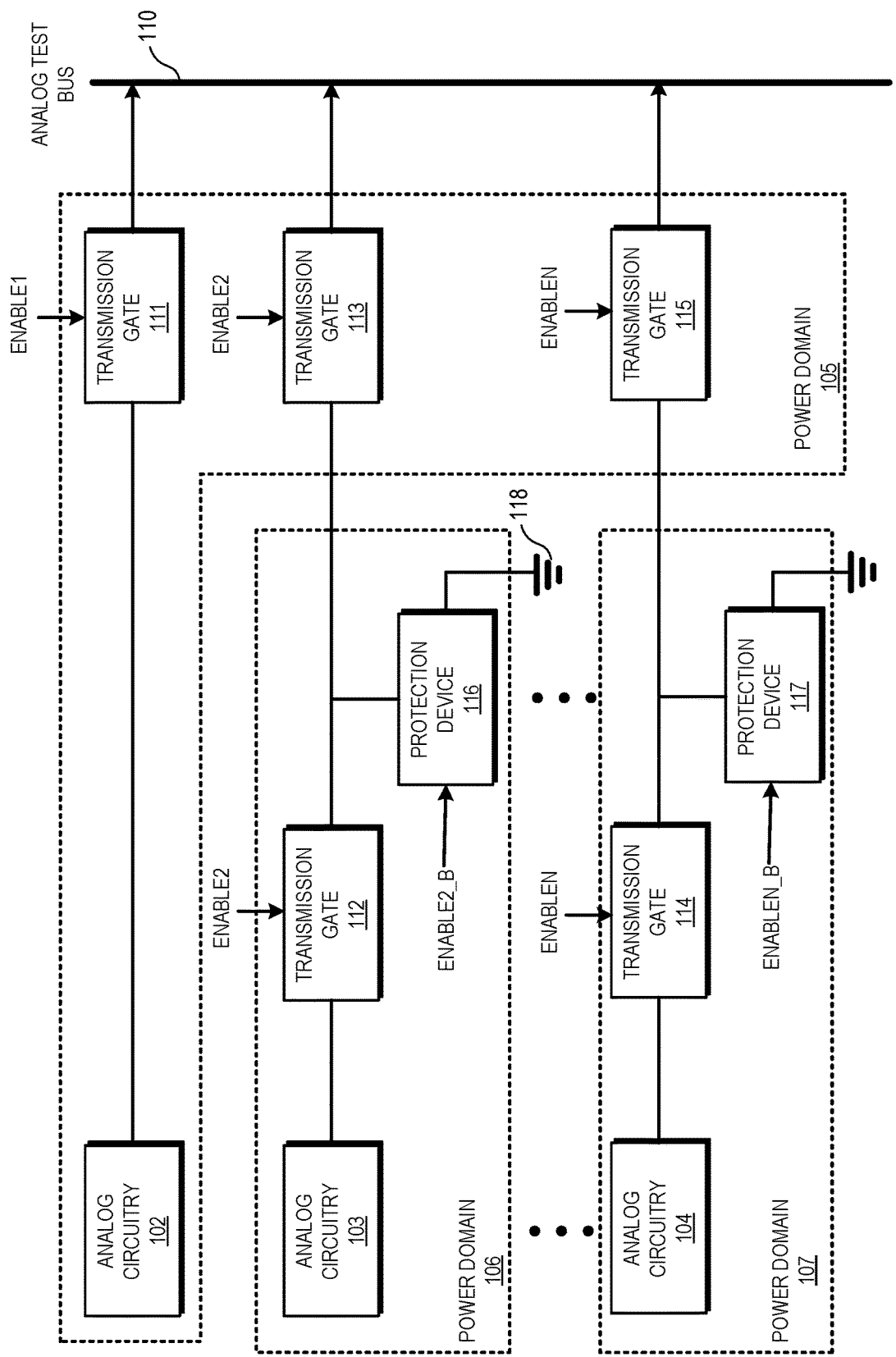
FIG. 1 is a block diagram of an integrated circuit device having analog circuitry associated with multiple power domains connected to a common analog test bus in accordance with some embodiments.

FIGS. 1-6 illustrate techniques for coupling analog circuitry associated with multiple power domains to the same analog test bus. The techniques include coupling multiple transmission gates between at least one set of analog circuitry and the analog test bus, thereby reducing the likelihood of latch-up and current leakage at the set of analog circuitry during testing. In addition, the techniques include coupling a protection device (e.g., a transistor) between the multiple transmission gates, wherein the protection device protects the set of analog circuitry from any parasitic voltage at the analog test bus during testing. By employing these techniques, analog circuitry associated with different power domains can be accurately and safely tested with a common analog testing bus, improving overall test accuracy and reducing test times, and allowing the testing circuitry to maintain a relatively small footprint at the integrated circuit device.

To illustrate, during power up, when a lower-voltage domain power supply is powered up first and a higher-voltage domain power supply is at zero volts, the following circuit dynamics will occur under different conditions. First, when a lower-voltage power domain circuitry is under test and is connected to an analog test bus through a higher-voltage power domain transmission gate, the diode of a p-channel metal oxide semiconductor (PMOS) transistor of the higher-voltage transmission gate associated with a lower-voltage power domain can become forward biased, resulting in a latch-up condition, and causing a loss of gate isolation. These conditions can change the voltage at the analog test bus, resulting in a loss of test accuracy. In addition, the relatively large latch-up current can damage the PMOS transistor and exposes the low-voltage analog circuitry to damage. By properly employing multiple transmission gates with proper power domain control between the analog circuitry of the lower-voltage power domain and the analog test bus, the likelihood of latch-up and loss of gate isolation is reduced.

Second, the use of a single transmission gate can result in a high amount of current leakage when the application of power to the different power domains is improperly sequenced. For example, if power is applied to a lower-voltage power domain before power is applied to a higher-power voltage domain, the bulk diode of PMOS at the transmission gate associated with the lower-voltage domain can become forward biased, resulting in a relatively high amount of current leaking from the analog circuitry of the lower-voltage power domain. By employing multiple transmission gates, controlled by control signals associated with different power domains, the risk of forward biasing the PMOS of a transmission gate is reduced, with a corresponding reduction in the risk of current leakage.

Third, the analog test bus can store a high electrostatic charge because of the large span of the bus. This charge can leak to the lower-voltage domain side of the higher-voltage domain transmission gate meant for testing lower-voltage domain analog circuitry. The leaked charge can create higher parasitic voltage at the intermediate node. This parasitic voltage can cause transmission gates associated with lower-voltage power domains to lose isolation, potentially resulting in the parasitic voltage damaging analog circuitry of the lower-voltage power domains. By employing a protection device, such as a transistor, between the transmission gates of the lower-voltage power domains, the parasitic voltage can be shunted to ground, thus protecting the analog circuitry of the lower-voltage power domains.

FIG. 1 illustrates, in accordance with some embodiments, an integrated circuit 100 including different sets of analog circuitry connected to a common analog test bus 110, wherein each of the sets of analog circuitry is associated with a different power domain. In different embodiments, the integrated circuit 100 is any integrated circuit that includes analog circuitry that can be tested via an analog test bus. Thus, in different embodiments, the integrated circuit 100 is a processor, processing unit, microcontroller, device controller, sensor device, and the like, or any combination thereof. Further, in at least some embodiments, the integrated circuit 100 is designed to perform tasks on behalf of a device that incorporates the integrated circuit 100. Thus, in different embodiments the integrated circuit 100 is incorporated in, and performs tasks (also referred to as operations) on behalf of, a desktop or laptop computer, a server, a smartphone, a tablet, an automotive device (e.g., a car, truck, sports utility vehicle, or motorcycle), and the like.

To support performance of operations, the integrated circuit 100 includes different sets of analog circuitry, wherein each set of analog circuitry is configured to perform one or more designated functions, according to the arrangement and connection of the components that make up the set of analog circuitry. For simplicity, a set of analog circuitry is referred to herein as "analog circuitry." Thus, the term analog circuitry represents one or more analog circuits at an integrated circuit that are collectively arranged and configured to perform one or more operations at the integrated circuit.

In the example of FIG. 1, the integrated circuit 100 includes analog circuitry 102, analog circuitry 103, and additional analog circuitry through Nth analog circuitry 104, where N is an integer. Each of the analog circuitry 102-104 is configured to perform one or more corresponding analog functions, such as signal generation, modification, amplification, control, and the like, or any combination thereof. It will be appreciated that in some embodiments, the integrated circuit 100 includes additional analog circuitry not illustrated at FIG. 1. Further, in some embodiments, the integrated circuit 100 includes digital circuitry (not shown) configured to perform digital operations on behalf of the integrated circuit 100.

Each of the analog circuitry 102-104 is associated with a different power domain. In the depicted example, the analog circuitry 102 is associated with a power domain 105, analog circuitry 103 is associated with a power domain 106, and analog circuitry 104 is associated with a power domain 107. As understood by one skilled in the art, a power domain refers to a collection of circuitry, and corresponding circuit components (e.g., transistors) coupled to the same supply voltage. Thus, as used herein, analog circuitry is associated with a power domain when the components of that analog circuitry are coupled to the supply voltage corresponding to the power domain. To illustrate via an example, in some embodiments the power domain 105 is a 1.5 volt (V) power domain indicating that the analog circuitry associated with the power domain 105, including the analog circuitry 102, is coupled to a 1.5 V supply voltage. In some embodiments the power domain 106 is a 1.2 V power domain indicating that the analog circuitry associated with the power domain 106, including the analog circuitry 103, is coupled to a 1.2 V supply voltage. Further, in some embodiments the power domain 107 is a 0.75 V power domain, indicating that the analog circuitry associated with the power domain 107, including the analog circuitry 104, is coupled to a 0.75 V supply voltage (the supply voltages are not illustrated at FIG. 1).

To support testing, each of the analog circuitry 102-104 is coupled to the analog test bus 110 via a corresponding set of transmission gates. Thus, in the example of FIG. 1, the integrated circuit 100 includes transmission gates 111, 112, 113, 114, and 115 (collectively referred to as transmission gates 111-115). The transmission gate 111 includes an input connected to the analog circuitry 102, an output connected to the analog test bus 110, and a control input to receive a control signal designated ENABLE1. The transmission gate 112 includes an input connected to the analog circuitry 103, an output, and a control input to receive a control signal designated ENABLE2. The transmission gate 113 includes an input connected to the output of the transmission gate 112, an output connected to the analog test bus 110, and a control input to receive the ENABLE2 control signal. The transmission gate 114 includes an input connected to the analog circuitry 104, an output, and a control input to receive a control signal designated ENABLEN. The transmission gate 115 includes an input connected to the output of the transmission gate 114, an output connected to the analog test bus 110, and a control input to receive the ENABLEN control signal.

The analog circuitry 102 is associated with the highest power domain and other analog circuitry, discussed below, are associated with other respective power domains. In some embodiments, the integrated circuit 100 includes multiple highest-power domains, and the transmission gates 111-115 are all associated with a single one of the highest-power domains. That is, in some embodiments, all of the transmission gates connected directly to the analog test bus 110 are associated with the same power domain.

Each of the transmission gates 111-115 is generally configured to have two selectable states, at least during normal operation, wherein the state of a transmission gate is determined by the state of the corresponding control signal. The two states include an active state (also referred to as an ungated state, an "on" state, and the like) and an inactive state (also referred to as a gated state, an "off" state, and the like). In the active state, the transmission gate passes a signal at the input of the transmission gate to the output of the transmission gate. Thus, in the active state, a voltage at the output of the transmission gate is the same as, or is based on, the voltage at the input of the transmission gate. In the inactive state, the input and output of the transmission gate are isolated from each other, so that the voltage at the output of the transmission gate (if any) is not based on the voltage at the input of the transmission gate. As described further below, during testing of the integrated circuit 100, the states of the transmission gates 111-115 can be controlled (via the corresponding enable signals) to couple a selected one of the analog circuits 102-104 to the analog test bus 110. Further, by having multiple transmission gates between, for example, the analog circuitry 103 and the analog test bus 110, the integrated circuit 100 is able to reduce the likelihood of latch-up, gate isolation issues, and other testing issues, as described further below.

The integrated circuit 100 also includes protection devices 116 and 117, wherein the protection device 116 includes a terminal connected to the output of the transmission gate 112, a terminal connected to a ground reference, and a control input to receive a control signal designated ENABLE2_B, wherein the "_B" suffix indicates that the signal is a complement of the signal ENABLE2. The protection device 117 includes a terminal connected to the output of the transmission gate 114, a terminal connected to a ground reference, and a control input to receive a control signal designated ENABLEN_B. Each of the protection devices 116 and 117 includes circuitry (e.g., a transistor) configured to be placed in an open state or a closed state, based on the state of the corresponding control signal. As described further herein, in at least some embodiments the state of the protection devices 116 and 117 are set during testing of the integrated circuit 100 to protect the transmission gate 112 and 114 and as well the analog circuitry 103 and 104, respectively, from being impacted by parasitic voltage at the analog test bus 110.

In operation, the transmission gates 111-115 and the protection devices 116 and 117 can be controlled, during testing of the integrated circuit 100, to couple a selected one of analog circuitry 102-104 to the analog test bus 110, while isolating the remaining analog circuitry, and reducing the impact of any parasitic voltage at the analog test bus 110. For example, in at least one test configuration, the ENABLE1 control signal is placed in an asserted state, thus setting the transmission gate 111 to the active state and coupling the analog circuitry 102 to the analog test bus 110. The remaining control signals, including ENABLE2 and ENABLEN, are placed in negated states, thus setting the corresponding transmission gates 112, 113, 114, and 115 into inactive states. This configuration isolates the analog circuitry 103 and 104 from the analog test bus 110. Accordingly, the voltage at the analog test bus 110 represents the operation of the analog circuitry 102 only, and is not impacted by the analog circuitry 103 and 104. Furthermore, because the analog circuitry 103 and 104 are each isolated from the analog test bus 110 by a plurality of corresponding transmission gates, the likelihood of latch-up and current leakage at the power domains 106 and 107 is reduced. This isolation can also improve test accuracy and reduce test times for testing of multiple higher voltage domain analog circuitry.

Figure 2:
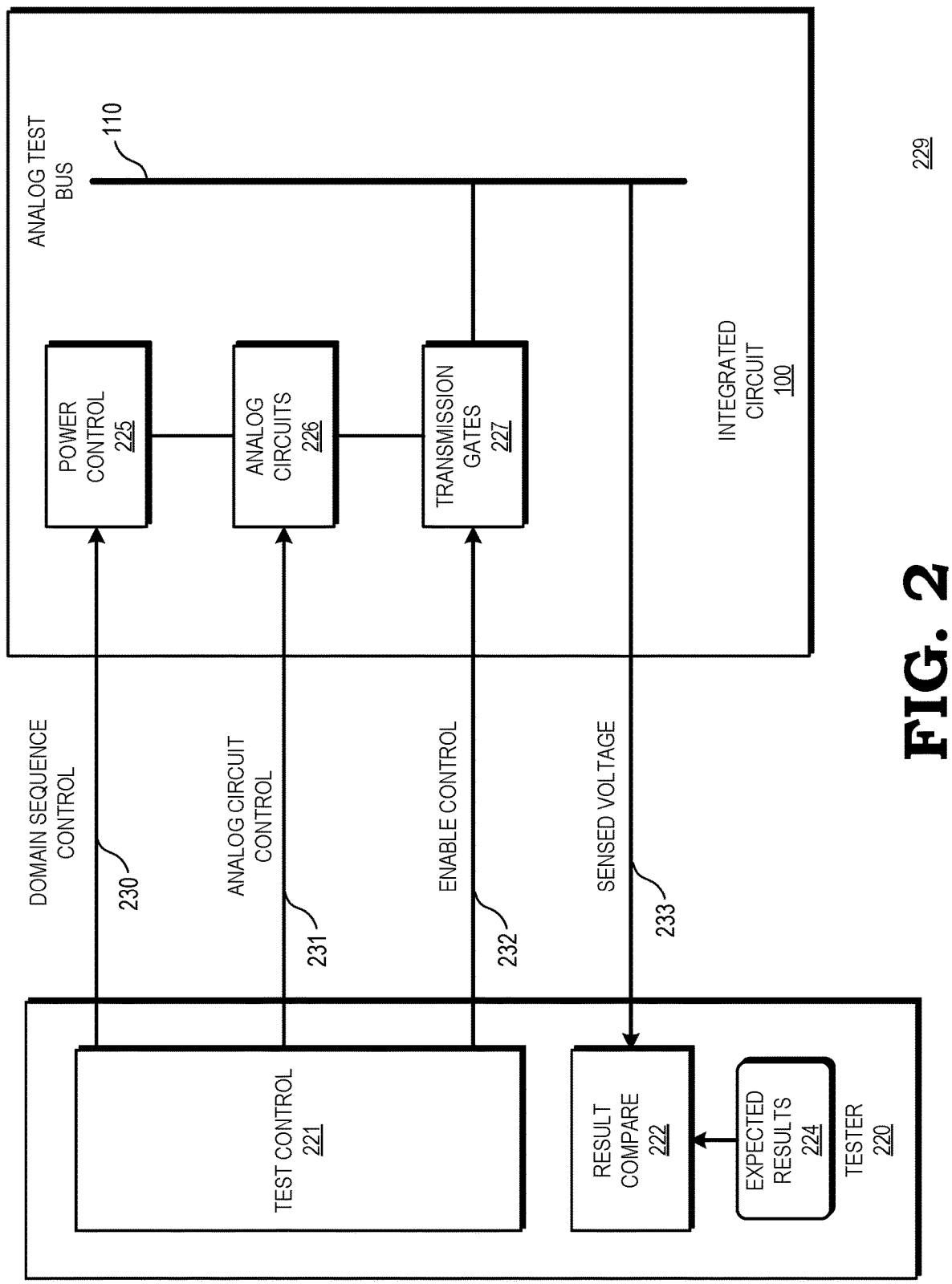
FIG. 2 is a block diagram of an example test environment employing the integrated circuit device of FIG. 1 in accordance with some embodiments.

Testing of the integrated circuit 100 can be better understood with reference to FIG. 2, which illustrates a test environment 229 in accordance with some embodiments. In the depicted example, the test environment 229 includes the integrated circuit 100 connected to a tester 220. The tester 220 is a computer device (e.g., a desktop computer or server), and associated hardware interface devices, collectively configured to apply test stimuli (e.g., signals) to the integrated circuit 100, to sense voltages and other signals generated at the integrated circuit 100 in response to the test stimuli, and to compare the sensed voltages and other signals (referred to herein generally as test results) to a set of expected results 224.

To facilitate testing of the integrated circuit 100, the tester 220 includes a test control module 221 generally configured to generate a set of test signals, including a domain sequence control signal 230, an analog circuit control signal 231, and an enable control signal 232. In some embodiments, the test control module 221 includes one or more processors configured to execute software stored at a computer readable medium, wherein the software manipulates the process to execute operations, including generation of the signals 230 and 231, described further herein. It will be appreciated that although the domain sequence control signal 230, analog circuit control signal 231, and enable control signal 232 are illustrated and described as single signals, in some embodiments each of the depicted signals can represent multiple corresponding signals.

The tester 220 also includes a result compare module 222 generally configured to sense a voltage (referred to as sensed voltage 233) at the analog test bus 110 of the integrated circuit 100, and to compare the sensed voltage to an expected voltage indicated by the expected results 224. In some embodiments, the result compare module 222 is or includes software executed at the same set of processors executing the test control module 221. Further, in some embodiments the tester 220 implements a graphical user interface (GUI) or other interface to present results of the voltage comparison to a user of the tester 220. Thus, for example, the result compare module 222 can be configured to identify for a user, via the GUI when the sensed voltage 233 does not match the expected voltage.

In the illustrated embodiment, the test signals generated by the tester 220 are applied to various circuits of the integrated circuit 100, including a power control module 225, analog circuits 226, and transmission gates 227. The analog circuits 226 include the analog circuitry to be tested, including the sets of analog circuitry 102-104 of FIG. 1. The transmission gates 227 include the transmission gates, and corresponding protection devices, that couple the analog circuits 226 to the analog test bus 110. Thus, the transmission gates 227 includes the transmission gates 111-115, as well as the protection devices 116 and 117, of FIG. 1. The power control module 225 is a circuit generally configured to control the application of power to the power domains 105-107 of the integrated circuit 100, based on the domain sequence control signal 230. Thus, the power control module 225 controls whether each power domain is in an active state, wherein one or more specified voltages are applied to the corresponding voltage rails of the power domain, or an inactive state, where the specified voltages are not applied to the voltage rails for the power domain.

For purposes of description, it is assumed that each test of the integrated circuit 100 is governed by a test specification, wherein each test specification indicates the set of analog circuitry to be tested, the required state of each power domain of the integrated circuit 100, and any test stimuli to be applied to the analog circuitry to be tested. To implement a given test, the test control module 221 is configured to 1) set each power domain to the specified state, via application of the domain sequence control signal 230, 2) apply the specified test stimuli to the specified analog circuitry, via the analog circuit control signal 231, and 3) set the states of the transmission gates 227, via the enable control signal 232, to a) couple the specified analog circuitry to the analog test bus 110 and b) decouple and isolate the other analog circuits (the analog circuits that are not under test) from the analog test bus 110. This results in the analog circuitry under test applying a voltage to the analog test bus 110, and this applied voltage is sensed by the result compare module 222. The result compare module 222 compares the sensed voltage to the expected results 224, and indicates via a user interface the results of the comparison.

Figure 3:
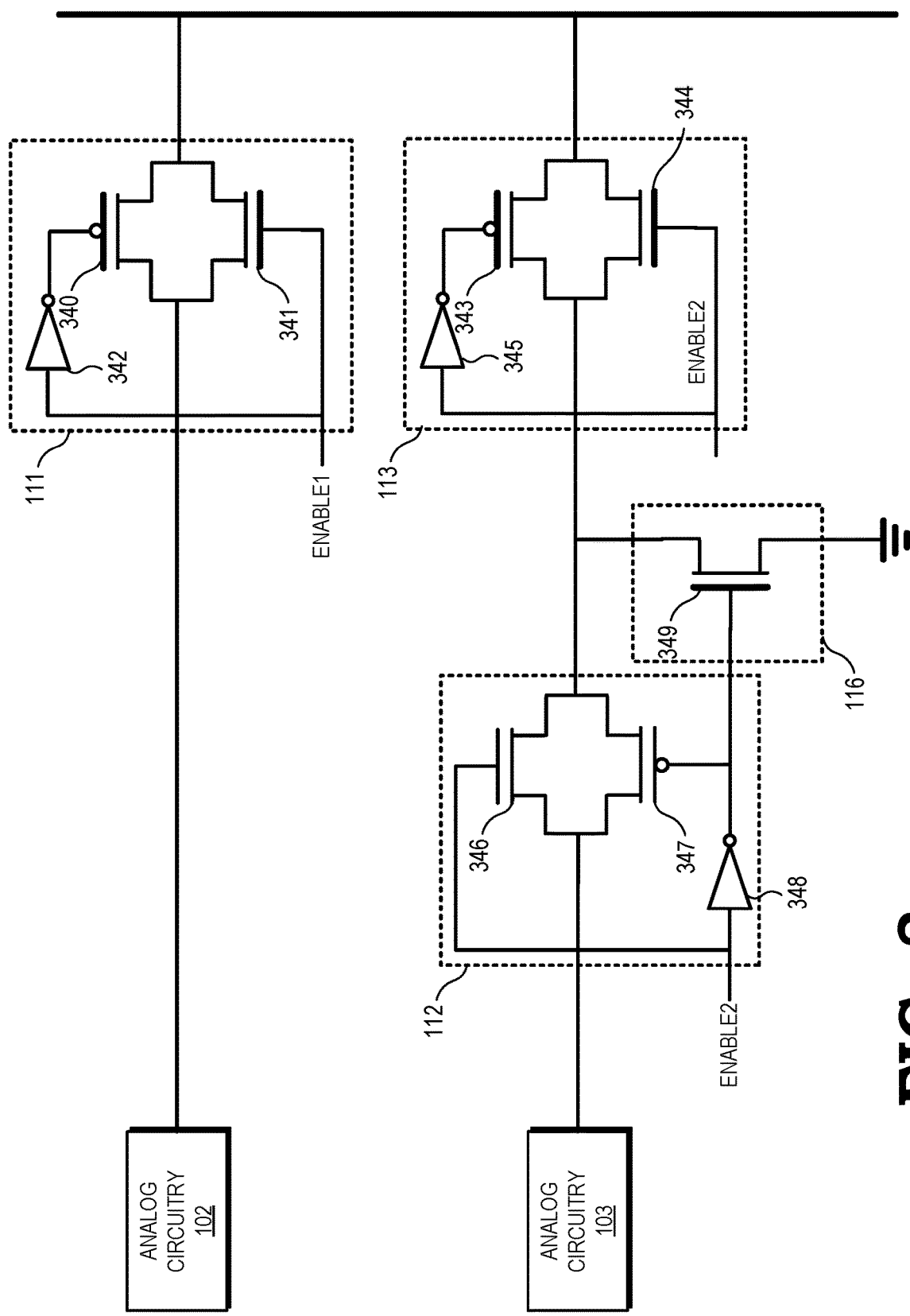
FIG. 3 is a block diagram illustrating additional details of transmission gate and protection device structures of the integrated circuit device of FIG. 1 in accordance with some embodiments.

FIG. 3 is a block diagram illustrating additional details of transmission gate and protection device structures of the integrated circuit device of FIG. 1 in accordance with some embodiments. The depicted example illustrates the circuitry of the transmission gates 111, 112, and 113 as well as protection structure 116. It will be appreciated that the other corresponding transmission gates and protection structures illustrated at FIG. 1 include similar circuitry.

As illustrated, the transmission gate 111 includes a PMOS transistor 340, an n-channel MOS (NMOS) transistor 341, and an inverter 342. The inverter 342 includes an input to receive the signal ENABLE1 and an output. The PMOS transistor 340 includes a source electrode connected to the analog test bus 110, a drain electrode connected to the analog circuitry 102, and a gate electrode connected to the output of the inverter 342. The NMOS transistor 341 includes a source electrode connected to the analog test bus 110, a drain electrode connected to the analog circuitry 102, and a gate electrode to receive the signal ENABLE1.

The transmission gate 112 includes an NMOS transistor 346, an NMOS transistor 347, and an inverter 348. The inverter 348 includes an input to receive the signal ENABLE2 and an output. The NMOS transistor 346 includes a drain electrode, a source electrode connected to the analog circuitry 103, and a gate electrode connected to receive the signal ENABLE2. The PMOS transistor 347 includes a drain electrode connected to drain electrode of the NMOS transistor 346, a source electrode connected to the analog circuitry 103, and a gate electrode connected to the output of the inverter 348.

The transmission gate 113 includes a PMOS transistor 343, an NMOS transistor 344, and an inverter 345. The inverter 345 includes an input to receive the signal ENABLE2 and an output. The PMOS transistor 344 includes a source electrode connected to the analog test bus 110, a drain electrode connected to the drain electrode of the NMOS transistor 346, and a gate electrode connected to the output of the inverter 345. The NMOS transistor 341 includes a source electrode connected to the analog test bus 110, a drain electrode connected to the drain electrode of the NMOS transistor 346, and a gate electrode to receive the signal ENABLE2.

The protection structure 116 includes an NMOS transistor 349 having a drain electrode connected to the drain electrode of the NMOS transistor 346, a source electrode connected to the ground voltage reference 118, and a gate electrode connected to the output of the inverter 348.

In the example of FIG. 3, at least some of the transistors have different sizes, including different gate thicknesses, and thus the state of the transistors is controlled by the threshold voltages of the corresponding power domain at the corresponding gates. For example, the transistors 346 and 347 are transistors of a relatively small size, and the state of the transistors 346 and 347 are therefore controlled based on a relatively low threshold voltage at the corresponding gate electrodes. The transistors 340, 341, 343 and 344 are transistors of a relatively large size, and the state of these transistors is controlled based on a relatively high threshold voltage at the corresponding gate electrodes. In some embodiments, the transistor 349 is a higher power domain transistor, but is controlled by a lower power domain inverter 348. Since only parasitic voltage discharge is required by switching-on the transistor 349, as described further below, a lower power domain voltage generated by the inverter 348 is sufficient. In this case, the transistor 349 may operate in sub-threshold or triode region depending on the threshold voltage of the transistor 349 and the voltage associated with the power domain 106. As explained further below, by employing transistors of different sizes at the different transmission gates, the integrated circuit 100 is able to provide good isolation between sets of analog circuitry during testing, while also supporting relatively short testing times as well as accurate testing of the analog circuitry.

Figure 4:
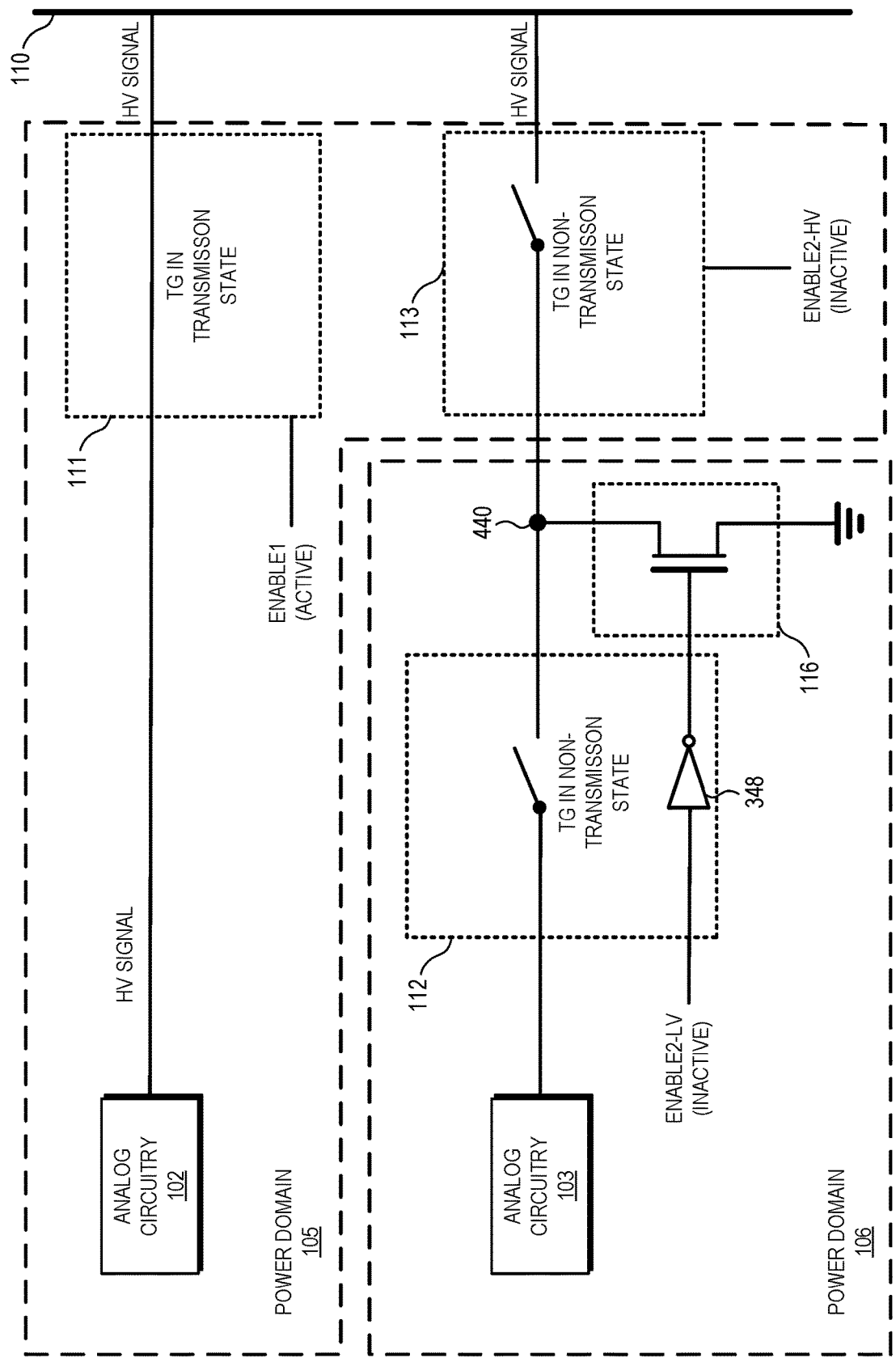
FIGS. 4-6 are block diagrams illustrating examples of testing analog circuitry of the integrated circuit device of FIG. 1 in accordance with some embodiments.

As noted above, by placing multiple transmission gates between the analog test bus 110 and at least some of the analog circuitry, the integrated circuit 100 is able to effectively isolate the analog circuitry that is not being tested from the analog test bus 110, thereby improving test accuracy and protecting analog circuitry that is not being tested. An example is illustrated at FIG. 4 in accordance with some embodiments. In the depicted example, it is assumed that the analog circuitry 102 is under test. Accordingly, the tester 220 has set the enable signals to the corresponding states so that the transmission gate 111 is in the active state (that is, in the transmission state), and so that the transmission gates 112 and 113 are in inactive states (that is, each transmission gate is in the non-transmission state). Accordingly, the analog circuitry 102 generates a signal that is transmitted, via the transmission gate 111, to the analog test bus 110. Furthermore, the generated signal is isolated from the analog circuitry 103.

In the depicted example, the analog circuitry 103 is isolated from the analog test bus 110, and therefore the signal generated by the analog circuitry 102, by both the transmission gates 112 and 113. This provides better isolation for the analog circuitry 103 than using a single transmission gate. To illustrate, it will be appreciated that, because the analog circuitry 102 is associated with a relatively high voltage power domain (the power domain 105 of FIG. 1), the generated signal can have a relatively high voltage (e.g., 1.5 volts). This relatively high voltage signal, if transmission gate 113 was not present, would be applied at node 440. The presence of the high voltage signal at node 440 could forward bias the diode of the PMOS transistor 347 of the transmission gate 112, resulting in a latch-up condition and the loss of gate isolation, potentially resulting in a loss of test accuracy, damage to the analog circuitry 103, and the like.

Because the transistors 343 and 344 of the transmission gate 113 are of a relatively large size, the high-voltage signal at the analog test bus 110 does not forward bias the diode of the PMOS transistor 343, so the analog circuitry 103 remains isolated from the analog test bus 110. Accordingly, the use of the transmission gate 113 improves test accuracy and improved protection of the analog circuitry 103.

Figure 5:
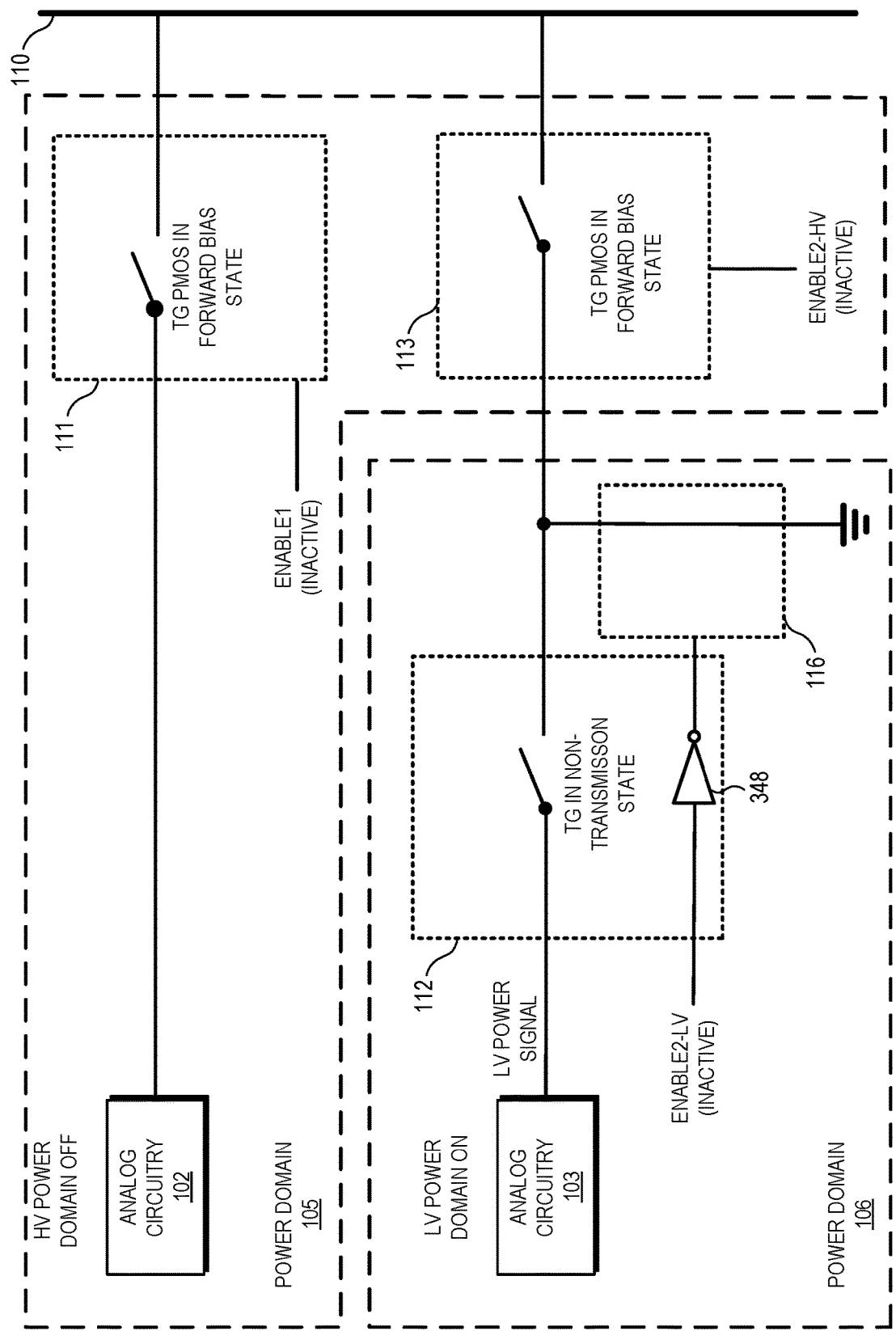

FIG. 5 is a block diagram illustrating an example of the protection provided by the transmission gate 112 in accordance with some embodiments. In the illustrated example, the application of power to the different power domains 105 and 106 has been sequenced such that, at least temporarily, the power domain 105 is in an inactive state and the power domain 106 is in an active state. Under these conditions, the gate and bulk of PMOS transistors of the transmission gates 111 and 113 (that is, the transistors 340 and 343) are connected to zero volts, thus forward biasing the bulk diode of the PMOS transistors 343 in the absence of transmission gate 112. Since the gate voltage of the PMOS transistor 343 is at zero volts, the transistor 343 is in a conducting state. This allows the transmission of voltage at the power domain 106 to the analog test bus 110. This results in a voltage build-up at analog test bus 110 and zero volts at the bulk of PMOS transistor 340, which causes forward biasing of bulk diode of PMOS transistor 340. A conduction path is also formed from analog test bus 110 towards analog circuitry 102. Thus, even though the transmission gates 111 and 113 are in the inactive (non-transmission state), the forward biasing of the bulk diode of PMOS transistors can provide a path, via the analog test bus 110, for current leakage from the analog circuitry 103 to the analog circuitry 102. That is, in the absence of the transmission gate 112, this bulk diode forward biasing could result in a large amount of current leakage, via the analog test bus 110, from the analog circuitry 103 to the analog circuitry 102. However, in the illustrated example, the transmission gate 112 is placed in the inactive (non-transmission) state, isolating the analog circuitry 103 from the transmission gate 113 and the analog test bus 110 and reducing or preventing the current leakage. Thus, as illustrated by the examples of FIGS. 4 and 5, the use of multiple transmission gates between the analog circuitry 103 and the analog test bus 110 can provide improved isolation of the analog circuitry 103 and reduce current leakage and the likelihood of latch-up.

Figure 6:
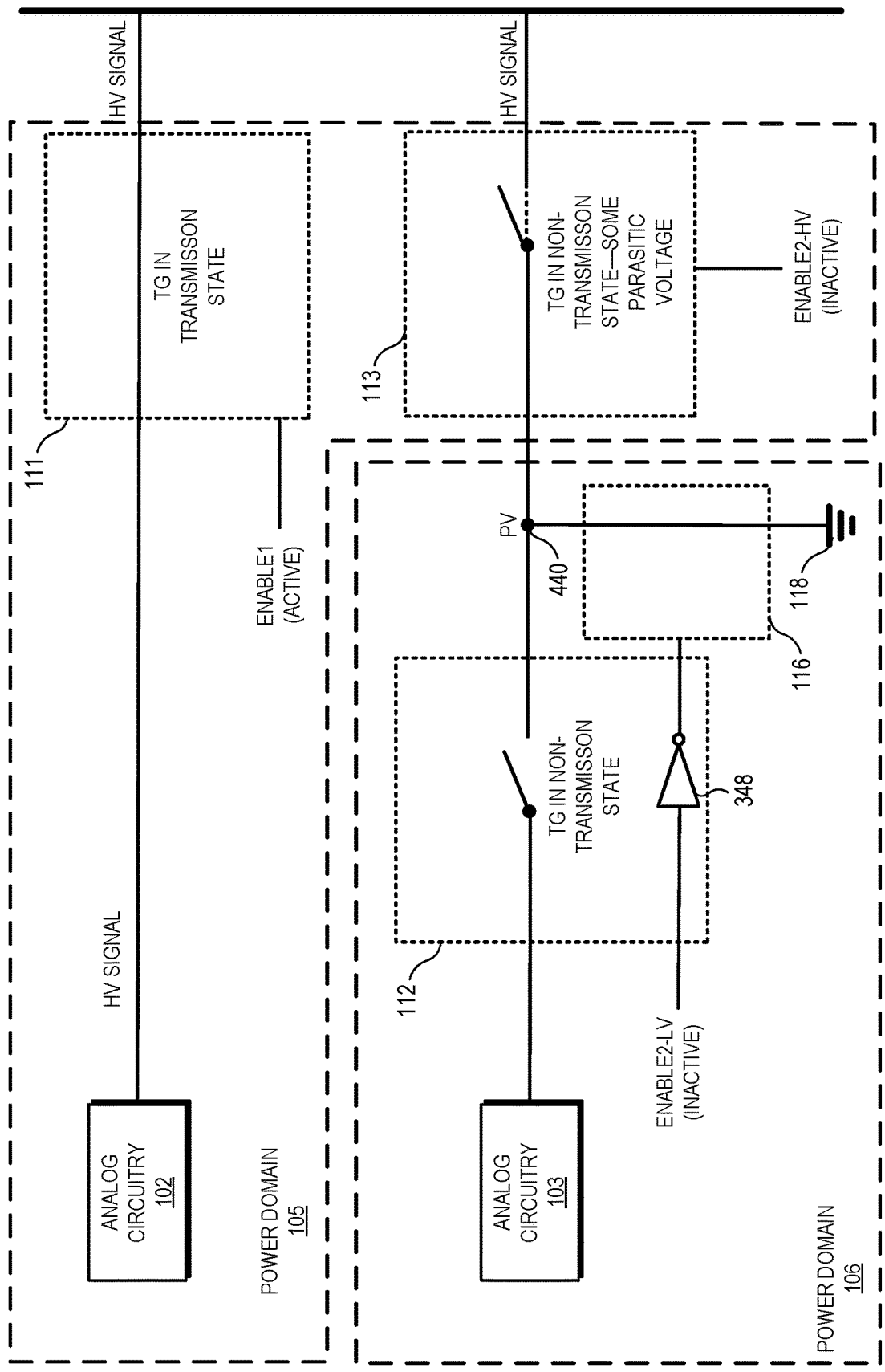

FIG. 6 is a block diagram illustrating an example of the protection provided by the protection device 116 in accordance with some embodiments. In the illustrated example, similar to the example of FIG. 4, it is assumed that the analog circuitry 102 is under test. Accordingly, the tester 220 has set the enable signals to the corresponding states so that the transmission gate 111 is in the active state (that is, in the transmission state), and so that the transmission gates 112 and 113 are in inactive states (that is, each transmission gate is in the non-transmission state). Thus, the analog circuitry 102 generates a signal that is transmitted, via the transmission gate 111, to the analog test bus 110.

Furthermore, because the transmission gates 112 and 113 are in the inactive state, the generated signal is mostly isolated from the analog circuitry 103 and the analog test bus 110. However, some parasitic voltage from the analog test bus 110 is coupled across the transmission gate 113, and therefore is placed at the node 440. In the absence of the protection structure 116, this parasitic voltage places stress on the transistors of the transmission gate 112. However, in the illustrated example, the protection device 116 is activated, so that the parasitic voltage is coupled to the ground reference 118, thus protecting the devices of the transmission gate 112.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An integrated circuit comprising:
an analog test bus;
a plurality of analog circuits including a first analog circuit, each of the plurality of analog circuits associated with a corresponding one of a plurality of power domains;
a first plurality of transmission gates coupled between the first analog circuit and the analog test bus; and
a first protection device coupled between the first plurality of transmission gates and a ground reference.

2. The integrated circuit of claim 1, wherein the first protection device is configured to couple a parasitic voltage associated with the analog test bus to the ground reference when a first transmission gate of the first plurality of transmission gates is in a non-transmission state.

3. The integrated circuit of claim 1, further comprising:
a second plurality of transmission gates coupled between the analog test bus and a second analog circuit of the plurality of analog circuits.

4. The integrated circuit of claim 3, further comprising:
a second protection device coupled between the second plurality of transmission gates and the ground reference.

5. The integrated circuit of claim 1, further comprising:
a single transmission gate coupled between the analog test bus and a second analog circuit of the plurality of analog circuits.

6. The integrated circuit of claim 5, wherein the second analog circuit is associated with a highest power domain of the plurality of power domains.

7. The integrated circuit of claim 1, wherein:
the first plurality of transmission gates includes a first transmission gate and a second transmission gate; and
the first transmission gate is controlled by a first enable signal associated with a first power domain of the plurality of power domains and the second transmission gate is controlled by a second enable signal associated with a second power domain of the plurality of power domains.

8. The integrated circuit of claim 7, wherein the second power domain is a highest power domain of the plurality of power domains.

9. The integrated circuit of claim 1, wherein:
the first plurality of transmission gates includes a first transmission gate and a second transmission gate; and
the first transmission gate includes a plurality of transistors of a first size and the second transmission gate includes transistors of a second size.

10. An integrated circuit, comprising:
an analog test bus;
first analog circuitry associated with a first power domain; and
a first plurality of transmission gates coupled between the first analog circuitry and the analog test bus.

11. The integrated circuit of claim 10, further comprising:
a first protection device coupled between the first plurality of transmission gates and a ground reference, the first protection device, wherein the first protection device is configured to couple a parasitic voltage associated with the analog test bus to the ground reference when a first transmission gate of the first plurality of transmission gates is in a non-transmission state.

12. The integrated circuit of claim 11, further comprising:
second analog circuitry associated with a first power domain; and
a second plurality of transmission gates coupled between the second analog circuitry and the analog test bus.

13. The integrated circuit of claim 12, further comprising:
a second protection device coupled between the second plurality of transmission gates and the ground reference.

14. The integrated circuit of claim 10, further comprising:
a single transmission gate coupled between the analog test bus and a second analog circuit.

15. The integrated circuit of claim 14, wherein the second analog circuit is associated with a highest power domain of a plurality of power domains of the integrated circuit.

16. The integrated circuit of claim 10, wherein:
the first plurality of transmission gates includes a first transmission gate and a second transmission gate; and
the first transmission gate is controlled by a first enable signal associated with the first power domain and the second transmission gate is controlled by a second enable signal associated with a second power domain of the integrated circuit.

17. The integrated circuit of claim 16, wherein the second power domain is a highest power domain of the integrated circuit.

18. A method, comprising:
selectively coupling, via a first transmission gate controlled by a test control module, first analog circuitry to an analog test bus;
selectively decoupling, via at least one of a plurality of transmission gates controlled by the test control module, second analog circuitry from the analog test bus; and
sensing, by a result compare module, a voltage generated by the first analog circuitry at the analog test bus.

19. The method of claim 18, further comprising:
coupling a parasitic voltage at the analog test bus to a ground reference.

20. The method of claim 18, wherein the first analog circuitry and the second analog circuitry are associated with different power domains of an integrated circuit.

* * * * *